United States Patent [19]

Gemba et al.

[11] Patent Number: 4,925,461
[45] Date of Patent: May 15, 1990

[54] PROCESS FOR SEPARATING NITROGEN GAS BY PRESSURE SWING ADSORPTION SYSTEM

[75] Inventors: Tsuneo Gemba; Takeshi Tamaru, both of Okayama; Tetsuhiko Matsuura, Bizen, all of Japan

[73] Assignee: Kuraray Chemical Co., Ltd., Bizen, Japan

[21] Appl. No.: 304,562

[22] Filed: Feb. 1, 1989

[51] Int. Cl.$^5$ ............................................. B01D 53/04
[52] U.S. Cl. .......................................... 55/26; 55/58; 55/62; 55/68; 55/75
[58] Field of Search ................... 55/25, 26, 58, 62, 68, 55/75

[56] References Cited

U.S. PATENT DOCUMENTS

| | | | |
|---|---|---|---|
| 4,256,469 | 3/1981 | Leitgeb | 55/25 |
| 4,264,339 | 4/1981 | Jüntgen et al. | 55/25 |
| 4,348,213 | 9/1982 | Armond | 55/25 |
| 4,440,548 | 4/1984 | Hill | 55/26 |
| 4,494,966 | 1/1985 | Umeki | 55/26 |
| 4,515,605 | 5/1985 | Inoue et al. | 55/26 |
| 4,548,799 | 10/1985 | Knoblauch et al. | 55/25 X |
| 4,572,723 | 2/1986 | Ward | 55/25 |
| 4,576,614 | 3/1986 | Armond et al. | 55/58 X |
| 4,746,332 | 5/1988 | Tomomura et al. | 55/62 |
| 4,813,977 | 3/1989 | Schmidt et al. | 55/26 |
| 4,813,979 | 3/1989 | Miller et al. | 55/25 |

FOREIGN PATENT DOCUMENTS

| | | | |
|---|---|---|---|
| 0147277 | 7/1985 | European Pat. Off. | 55/25 |
| 60-027606 | 2/1985 | Japan | 55/25 |
| 60-166206 | 8/1985 | Japan . | |
| 63-079714 | 4/1988 | Japan | 55/25 |
| 63-151602 | 6/1988 | Japan | 55/25 |

*Primary Examiner*—Robert Spitzer
*Attorney, Agent, or Firm*—Oblon, Spivak, McClelland, Maier & Neustadt

[57] ABSTRACT

A process for separating nitrogen gas higher in purity than conventional products from a gas mixture predominantly composed of nitrogen gas and oxygen gas by the pressure swing adsorption system using carbon molecular sieve as adsorbent is characterized by the manner of communicating an adsorber after adsorption step with an adsorber after regeneration step for gas transfer from the former adsorber to the latter, the operation of discontinuing the gas transfer before establishment of pressure equalization, and the regeneration promotion by causing back flow of part of product gas.

The process can separate 99.99% pure nitrogen gas, which is never obtainable in the prior pressure swing adsorption processes, from air as raw material in an economic manner.

8 Claims, 2 Drawing Sheets

PROCESS FOR SEPARATING NITROGEN GAS BY PRESSURE SWING ADSORPTION SYSTEM

BACKGROUND OF THE INVENTION

This invention relates to a process for separating nitrogen gas by the pressure swing adsorption system (hereinafter referred to as "PSA system"). More particularly, it relates to a process for separating nitrogen gas of extremely high purity from a raw material gas mixture predominantly composed of nitrogen and oxygen, for example air, by means of an adsorber (adsorption bed) packed with a carbon (carbonaceous) molecular sieve (hereinafter referred to as "CMS") as an adsorbent.

The process for separating nitrogen gas from such a mixed gas by the PSA system by utilizing the difference in rate of adsorption on CMS between oxygen gas and nitrogen gas is already in practical use. The equilibrium adsorption of oxygen gas and that of nitrogen gas on CMS are almost equal to each other under the same temperature and pressure conditions. Just after initiation of adsorption, however, these gases show a remarkable difference in rate of adsorption. Thus, oxygen gas and water vapor are each adsorbed on CMS almost to the equilibrium adsorption in about 60 seconds, while nitrogen gas and argon are adsorbed little. The separation of nitrogen gas by the PSA system utilizes this characteristic.

The purity of nitrogen gas obtainable in practical processes using the PSA system is generally said to be at most 99.0% in the case of atmospheric pressure regeneration and at most 99.9% in the case of reduced pressure regeneration. It is regarded as difficult to separate nitrogen gas with a purity of 99.9% or higher in an economic manner by said system. It is a matter of course that any apparatus in which nitrogen gas having a high purity of 99.99% or more can be obtained is not known as yet.

Therefore, in cases where nitrogen having a higher purity is required, it is a common practice to combinedly use a purification apparatus for converting the remaining 0.1 to 1.0% by volume of oxygen to water by reaction with hydrogen gas, ammonia or the like in the presence of a catalyst and removing the resulting water, or for removing such oxygen by contacting with a reducing metal. In operating such purification apparatus, however, a highly dangerous gas is used for reaction or regeneration, as mentioned above. In addition, there remain many problems, such as contamination with unreacted gases, and marked increases in cost of equipment and cost of operation.

On the other hand, the prior art processes for producing high-purity nitrogen, typically the low temperature separation process, generally require a large-scale equipment, hence a large amount of investment. Accordingly, the site for plant construction is limited, and the cost of transportation to sites of consumption increases. For these reasons, the cost of nitrogen gas becomes very high.

As mentioned above, the separation of nitrogen gas by the PSA system is advantageous in that nitrogen gas can be readily obtained at low cost and by relatively simple mechanisms but the product nitrogen gas has a limited range of applications because of its low purity. The purity may be increased by addition of a purification apparatus, but with many demerits, as mentioned above.

Accordingly, a gas supply source which can produce high-purity nitrogen gas while retaining the advantageous features of the PSA system has been highly demanded in the fields of chemical industry, food industry, semiconductor industry and metal heat treatment industry, among others.

SUMMARY OF THE INVENTION

It is an object of the invention to provide a process for producing nitrogen gas, which is higher in purity than the prior art products obtained by the PSA system, from a gas mixture predominantly composed of nitrogen gas and oxygen gas by the PSA system using a carbon molecular sieve (CMS) as the adsorbent.

The process according to the invention is characterized in that, in a PSA apparatus, the transfer of the gas retained in an adsorber after completion of an adsorption step to another adsorber after completion of a regeneration step is carried out while maintaining the gas transfer flow rate in the portion connecting the raw material gas inlets to each other at about 3% to about 70% of the gas transfer flow rate in the portion connecting the gas outlets to each other and that the gas transfer is terminated before completion of pressure equalization of both adsorbers. In accordance with a further aspect of the invention, said process is further characterized in that, in the adsorber regeneration step, nitrogen gas is supplied backward from a product nitrogen gas tank to the adsorber to be regenerated to a nitrogen gas pressure at least about half the maximum pressure in the adsorption step and, thereafter, the next adsorption step is started. In this way, 99.99% pure nitrogen gas, which has never been obtained by the PSA system, can be separated in an economic manner.

When the above process is conducted in combination with atmospheric pressure regeneration, 99.9% pure nitrogen gas can be obtained at a much lower cost as compared with the prior art processes.

DETAILED DESCRIPTION OF THE INVENTION

A PSA system to which the present invention is applicable comprises the following constituent members: a plurality of adsorbers each packed with a carbon molecular sieve, a product stock tank for storing nitrogen gas separated, a vacuum pump, and pipelines and valves for connecting these members.

A pressurized gas mixture predominantly composed of nitrogen gas and oxygen gas, for example air, enters one adsorber, where oxygen gas, water vapor and the like are adsorbed, and the unadsorbed components, such as nitrogen gas and argon, pass through the adsorber and enter the product stock tank and are further used for various purposes. The raw material gas supply is switched from one adsorber to another at certain time intervals, so that nitrogen gas can be obtained almost continuously. The gas in the adsorber in which the adsorption is complete is depressurized by discharge into the atmosphere or the adsorber is further evacuated by means of a vacuum pump, whereby the gas adsorbed are desorbed and the carbon molecular sieve is regenerated. Generally, prior to gas release into the atmosphere, the gas remaining in the adsorber and having a high nitrogen gas concentration is transferred to another adsorber in which the regeneration is complete. Since the gas transfer is generally carried out until the pressures in both adsorbers become equal to each other, this procedure is referred to as equalization. The prior art process which gives nitrogen gas having a maximum purity involves pressure equalization by connecting the adsorber inlets to each other and the adsorber outlets to each other. In that case, a decrease in space velocity results in a decrease in oxygen concentration in nitrogen gas but there is a certain limit to the decrease in said oxygen concentration; the purity of nitrogen gas cannot reach 99.99%. This is the reason why the purity of nitrogen gas products obtained in the prior art by the PSA system is limited to 99.9%.

The present inventors made intensive investigations into the relationship between the nitrogen gas purity and the combination of various conditions in a process comprising discontinuing the gas transfer before the inside pressures in both adsorbers become equalized while varying the ratio between the gas transfer flow rates on the inlet and outlet sides and, as a result, found that nitrogen gas products having remarkably high purity can be obtained within a certain specific range of combination of such conditions. The present invention has been completed on the basis of this finding.

By the way, such operation as discontinuing gas transfer at a step earlier than the attainment of pressure equalization or varying the ratio between the gas transfer flow rates on the inlet and outlet sides has never been known at all in the prior art processes for separating nitrogen gas by PSA.

Thus, in one aspect, the invention relates to a process for separating nitrogen gas from a pressurized gas mixture predominantly composed of nitrogen gas and oxygen gas in a nitrogen gas separation apparatus comprising a plurality of adsorbers packed with a CMS and operable under the pressure swing adsorption system, which is characterized in that the transfer of the gas under pressure remaining in an adsorber A in which the adsorption step is complete to an adsorber B in which the regeneration step is complete is carried out through a pipeline connecting the raw material gas inlet of adsorber A to that of adsorber B and simultaneously through a pipeline connecting the product nitrogen outlet of adsorber A to that of adsorber B over a short period while the ratio of the gas flow rate on the raw material gas inlet side to the gas flow rate on the product nitrogen outlet side is adjusted to about 3 to about 70%.

Figure 1:
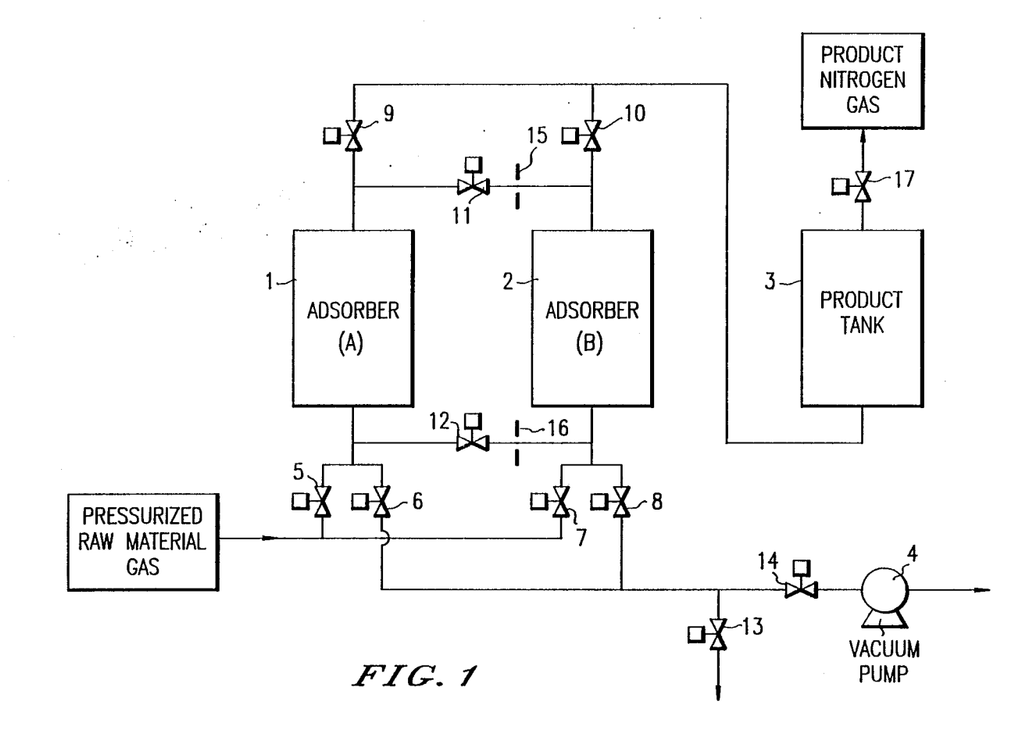
FIG. 1 is a schematic representation of an apparatus for nitrogen gas separation by the PSA system in which adsorber regeneration is carried out by means of a vacuum pump.

Referring to FIG. 1, the invention in the above aspect is described in further detail.

A pressurized raw material gas mixture predominantly composed of nitrogen and oxygen, enters an adsorber 1 through a valve 5 and is separated there into a fraction consisting of components adsorbed on the CMS packed in the adsorber and an unadsorbed fraction consisting of nitrogen gas and other unadsorbable components, and the product nitrogen gas is led, through a valve 9, to a product tank 3 for temporary storage and then consumed.

After the lapse of a certain period of time required for the separation capacity of said CMS to arrive at an accessible limit, the valves 5 and 9 are closed, and the adsorber 1 in which the adsorption step is complete and the adsorber 2 in which the regeneration step is complete are brought into communication with each other by opening the valves 11 and 12 for simultaneous communication of the product nitrogen outlet of one adsorber with that of another (hereinafter referred to as "upper communication") and of the raw material gas inlet of one adsorber with that of another (hereinafter referred to as "lower communication").

The gas remaining in adsorber 1 under pressure and having a high nitrogen gas percentage migrates into the adsorber 2 which is placed under atmospheric pressure or reduced pressure (about 50–150 torr) by the regeneration procedure, through the communication portions mentioned above, owing to the pressure difference between both adsorbers. On that occasion, the ratio of the rate of flow of the gas flowing through the lower communication portion to that of the gas flowing through the upper communication portion (hereinafter referred to as "transfer gas flow rate ratio") is adjusted to about 3 to about 70% by opening area adjustment of orifices 15 and 16.

The present inventors investigated the influences of various means of pressure equalization, such as upper equalization, lower equalization, upper and lower equalization, and serial equalization, on the purity of product nitrogen and, as a result, it was found that the nitrogen purity is lowest in the case of serial equalization, next lowest in the case of lower equalization, and increases in the order of upper equalization and upper and lower equalization. The term "serial equalization" as used herein means a gas transfer procedure which comprises bringing the product gas outlet of the adsorber in which the adsorption step is complete into communication with the raw material gas inlet of the adsorber in which the regeneration step is complete. Furthermore, it was found that, in upper and lower equalization, there is a region in which highest nitrogen purities can be obtained by adjusting the equalization conditions such that the rate of flow of the gas migrating through the upper communication portion is higher than that of the gas migrating through the lower communication portion.

Such optimum region varies depending on the method of regeneration. In the case of atmospheric regeneration in which the pressure is lowered to the vicinity of atmospheric pressure, the gas transfer flow rate ratio between both communication portions should desirably be about 10 to about 70%, while, in the case of reduced pressure regeneration at 50–150 torr, the range of about 3 to about 40% is desirable.

Furthermore, the time period for gas transfer between both adsorbers should be less than about 3 seconds. A longer period has an unfavorable influence on the purity of product nitrogen. It was further found that, in spite of such rapid gas transfer conditions, intergranular wear of CMS can be markedly inhibited when the upper and lower communications are established simultaneously and the gas transfer flow rate ratio between both communication portions is within the range specified above.

The scope of the invention is not limited to the case in which the gas transfer is performed until both adsorbers are equalized in pressure, namely until pressure equalization. Earlier than establishment of pressure equalization, the valves 11 and 12 may be closed and a valve 10 opened for causing back flow of product nitrogen from product tank 3 to adsorber 2. This mode of operation, when employed combinedly, may result in a little decrease in product yield on the raw material gas mixture basis but can be employed as necessary since there exist conditions suited for further increase in product nitrogen purity.

On the other hand, after discontinuation of the gas transfer by closing the valves 11 and 12, the adsorber 1 is regenerated by releasing the gas adsorbed and the gas remaining in said adsorber into the atmosphere by opening the valves 6 and 13 for depressurization to the vicinity of atmospheric pressure. During the regeneration period, the adsorber 1 may be rinsed by feeding a small amount of product nitrogen into it (such procedure is hereinafter referred to as "rinsing"). In the case of reduced pressure regeneration, the valve 13 is closed after depressurization of the adsorber to the vicinity of atmospheric pressure in the above manner, the valve 14 is then opened, a vacuum pump 4 is started and evacuation is carried out to 50–150 torr. These regeneration procedures are continued until completion of the adsorption step in adsorber 2.

Thereafter, the adsorption and regeneration steps are repeated alternately in adsorbers 1 and 2 in 180° phase shifts. The optimum period for such adsorption or regeneration, namely the optimum halfcycle period, lies in the range of 50–180 seconds.

In another aspect, the invention provides a process for separating nitrogen gas by the PSA system as mentioned hereinabove, which comprises the steps of:

(a) bringing the adsorber A in which the adsorption step is complete and the adsorber B in which the regeneration step is complete into upper communication and lower communication simultaneously and allowing the transfer of the gas within adsorber A into adsorber B to proceed while adjusting the gas transfer flow rate in the lower communication portion to that in the upper communication portion to about 0.03 to about 0.40, (b) discontinuing the gas transfer mentioned above under (a) when the absolute pressure ratio between the pressure inside the adsorber B, which is the gas receiving side, to the pressure inside the adsorber A, which is the gas supplying side, has arrived at a value within the range of about 0.10 to about 0.70, and (c) then, just prior to starting the next adsorption step, causing back flow of product nitrogen from the product tank into adsorber B to an extent such that the sum total of the quantity of the gas transferred in the above step (b) and the quantity of back flow product nitrogen amounts to about ½ or more of the total gas quantity in adsorber B at the time when a maximum pressure is found during the adsorption step.

Referring to FIG. 1, the above second aspect of the invention is now described in further detail.

A pressurized raw material gas mixture predominantly composed of nitrogen and oxygen, such as air or recovered nitrogen with a decreased purity, enters adsorber 1 through valve 5 and is separated into a fraction removed therefrom by adsorption on the CMS packed in the adsorber and a fraction composed of nitrogen and other unadsorbable components, and product nitrogen leaves the adsorber and enters product tank 3 through valve 9. After temporary storage in said tank, the product nitrogen is consumed.

After the lapse of a predetermined time and just prior to the arrival of the separation capacity of said CMS at an acceptable limit, the valves 5 and 9 are closed and the adsorber 1 in which the adsorption step is complete and the adsorber 2 in which the regeneration step is complete are brought into simultaneous communication between the product outlets and between the raw material gas inlets by opening the valves 11 and 12. The gas remaining in adsorber 1 under pressure and having a high nitrogen percentage migrates into adsorber 2, which is under reduced pressure (about 50–150 torr) as a result of the regeneration procedure, owing to the pressure difference between both adsorbers.

Investigations made by the present inventors into the influences of the means of accomplishing the above-mentioned gas transfer on the purity of product nitrogen revealed that a maximum purity of product nitrogen can be obtained in the upper and lower simultaneous communication mode when the transfer gas flow rate ratio is in the range of about 0.03 to about 0.40 and when the gas transfer is discontinued by closing the valves 11 and 13 optimally at the time when the absolute pressure ratio between adsorber 2 (gas receiving side) and adsorber 1 (gas supplying side) has arrived at a value within the range of about 0.10 to about 0.70, preferably 0.15 to 0.55.

The transfer gas flow rate ratio is adjusted by varying the opening area ratio between orifices 15 and 16, and the whole gas transfer from adsorber 1 to adsorber 2 is adjusted by varying the transfer time while the total opening area of both orifices is kept constant. Since, when the gas transfer time exceeds about 3 seconds, the purity of product nitrogen tends to decrease, the total opening area of both orifices should be selected within a range such that the gas transfer time will not exceed 3 seconds.

Although not yet certain, the reason why there is an optimum region with respect to the gas transfer quantity from the product nitrogen purity viewpoint is supposed to be that when the gas transfer quantity is excessively small, insufficient transfer of the gas having a high nitrogen content results in an increase in the raw material gas mixture quantity to be treated while when the gas transfer quantity is excessively large, the desorption of oxygen and other adsorbed components from CMS increases rapidly with the decrease in the pressure within supplying side adsorber 1.

When the pressure within adsorber 2 is low in the beginning of the next adsorption step, the raw material gas mixture passes through the adsorbent bed in a very short period of time to give a product of insufficient separation. Therefore, the valve 10 is opened for causing back flow of nitrogen from product tank 3 into adsorber 2. Originally, such back flow procedure is performed for purging low purity nitrogen remaining in the product outlet piping and so on after the procedure for pressure equalization between the adsorbers and, in view of the possible pressure fluctuation in product tank, the back flow quantity is generally held down to a minimum which is sufficient for achieving the purpose.

As far as the back flow procedure according to the invention is concerned, the effect of pressurizing the adsorber, in which the adsorption procedure is to be started, in advance with high purity nitrogen is emphasized rather than the effect of residual gas purging such as mentioned above, and the back flow quantity from product tank 3 to adsorber 2 should be selected such that the total of the adsorber-to-adsorber gas transfer quantity and the back flow product nitrogen quantity amounts to about ½ or more of the whole gas quantity in adsorber 2 at the time when a maximum pressure is found during the adsorption period. The ratio of the sum total of the adsorber-to-adsorber gas transfer quantity and the back flow product nitrogen quantity to the whole gas quantity in adsorber 2 at the time when a pressure maximum is found during the adsorption procedure as expressed in terms of the ratio of the absolute pressure after the gas transfer and back flow procedures to the maximum absolute pressure during the adsorption procedure should be about 50% or more, preferably 60% or more, when the back flow procedure is completed before starting the raw material gas mixture supply.

It is not always necessary that the back flow procedure should be performed before starting the raw material gas supply, as mentioned above. It is also possible to conduct the back flow procedure and raw material gas mixture supply simultaneously by opening the valves 7 and 10. In the latter case, the back flow quantity necessary for achieving an absolute pressure ratio falling within the range mentioned above is calculated based on the absolute pressure in adsorber 2 just after the adsorber-to-adsorber gas transfer, then the corresponding pressure drop in product tank 3 is calculated, and adjustment is performed by inserting an orifice or the like in the course of the piping between valve 10 and product tank 3 or of the piping for raw material gas mixture supply.

The product tank 3 is disposed for the purpose of leveling the product purity by admixture and dilution of the nitrogen having relatively low purity as produced in the early phase of the adsorption step. The tank specification is determined primarily with the capacity necessary for achieving said purpose as a minimum requirement. In PSA-based nitrogen gas separation apparatus comprising a plurality of adsorbers, the pressure fluctuation due to adsorber switching over is very slight and can be satisfactorily absorbed within the above capacity range. Demand fluctuations are generally coped with by disposing an additional tank or tanks.

In a system in which product nitrogen is caused to flow back in large quantities from the product tank into the adsorber, as in the above-mentioned aspect of the invention, the product tank inside pressure may fluctuate widely, possibly exerting an unfavorable influence on the consumption side pressure and further rendering it difficult to control the back flow, even when the product consumption rate is maintained constant. Therefore, the capacity of product tank 3 should be selected such that the gage pressure in the product tank can be always maintained at about 70% or more, preferably 80% or more, of the maximum gage pressure in the adsorber during the adsorption step, inclusive of the period of back flow of product nitrogen into the adsorber.

The adsorption step in adsorber 2 starts upon receiving the raw product gas mixture fed via valve 7. The results of experiments performed by the present inventors showed that, for increasing the purity of product nitrogen, the maximum pressure in the adsorber during the adsorption step should be at least about 5 kg/cm$^2$ (G) but that almost no effect can be observed in the range exceeding 10 kg/cm$^2$ (G). Therefore, said maximum pressure should preferably be within the range of 6–10 kg/cm$^2$ (G).

On the other hand, the gas adsorbed and the gas remaining in adsorber 1 are released out of the system by opening the valves 6 and 13 following discontinuation of the adsorber-to-adsorber gas transfer. When a pressure in the neighborhood of atmospheric pressure is attained, the valve 13 is closed, the valve 14 is opened, and the pressure is reduced to 150 torr or below, preferably 50–100 torr, by means of vacuum pump 4. The regeneration procedure under reduced pressure is continued until completion of the adsorption step in adsorber 2.

Thereafter, the adsorption and regeneration steps are repeated alternately in adsorbers 1 and 2 in 180° phase shifts. The optimal period for the adsorption step inclusive of product nitrogen back flow, or for the regeneration step, namely the optimal half-cycle period, is within the range of 60–180 seconds.

The product nitrogen purity increasing effect as producible in the PSA-based nitrogen gas separation process according to the first or second aspect of the invention is of significance not only in increasing the purity of product nitrogen but also in reducing the cost of product nitrogen since when the purity is maintained at the same level as in the prior art, the equipment can be of small size, the quantity of raw material gas mixture per unit quantity of product can be reduced and accordingly power saving becomes possible.

In a third aspect thereof, the invention provides a process for separation of at least 99.99% pure nitrogen gas from a pressurized raw material gas mixture containing more than 78% of nitrogen gas by volume 1 oxygen and small amounts of other gas by the PSA system as mentioned hereinabove, which comprises the steps of:

(a) bringing the adsorber A in which the adsorption step is complete and the adsorber B in which the regeneration step under reduced pressure is complete into upper communication and lower communication simultaneously to thereby cause gas transfer from adsorber A under pressure to adsorber B under reduced pressure and discontinuing the gas transfer before both adsorbers are equalized in pressure, (b) then bringing the product nitrogen outlet of adsorber B into communication with the inlet of a product tank to thereby cause back flow of product nitrogen into adsorber B and, when the gage pressure in adsorber B has arrived at about 50% or more of the maximum gage pressure during the adsorption step, starting the adsorption step by introducing the raw material gas mixture into adsorber B, and (c) carrying out the regeneration step in adsorber A, following the discontinuation of adsorber-to-adsorber gas transfer in step (a), by releasing the gas remaining in said adsorber into the atmosphere to the neighborhood of atmospheric pressure followed by evacuation to about 150 torr or below by means of a vacuum pump, the adsorption and regeneration steps being alternately repeated in adsorbers A and B, the time required for said regeneration step and for said adsorption step inclusive of the product nitrogen back flow process being within the range of about 90 seconds to about 180 seconds.

Referring to FIG. 1, the invention in this third aspect is now described in further detail.

The pressurized raw material gas mixture enters adsorber 1 (adsorber A) via valve 5. Oxygen and other components to be removed are adsorbed on a CMS packed in the adsorber, and the thus-separated product nitrogen enters product tank 3 via valve 9 and is stored temporarily in said tank and then consumed. The pressure in said adsorber influences the purity of product nitrogen.

The results of experiments made by the present inventors revealed that, for the process to be practical, said pressure should reach at least about 5 kg/cm$^2$ (G) and that the effect of the pressure is little in the range of 10 kg/cm$^2$ (G) and higher. Therefore, the range of 6-10 kg/cm$^2$ (G) is preferable. Furthermore, fluctuations of the pressure of the feed mixture gas should be avoided as far as possible.

In particular in the separation of high purity (at least 99.99% pure) nitrogen, desorption, in small quantities, of oxygen and other components adsorbed on CMS, insufficient adsorptive separation due to the pressure difference within the adsorber and contamination with the low purity nitrogen remaining in the adsorber are crucial inhibitory factors.

For reducing the quantity of raw material gas as required per unit quantity of product nitrogen, the adsorber 1 (adsorber A) in which the adsorption step is complete and the adsorber 2 (adsorber B) in which the reduced pressure regeneration step is complete are brought into upper communication and at the same time into lower communication by opening valves 11 and 12 following closure of valves 5 and 9 and the gas remaining in adsorber 1 (adsorber A) under elevated pressure and having a high nitrogen content is thus caused to migrate into adsorber 2 (adsorber B) under reduced pressure.

In this procedure, it is necessary that the quantity of gas migrating through the upper communication portion should be greater than that of gas migrating through the lower communication portion. The gas flow rate in the lower communication portion is desirably within the range of about 3 to about 30% of the gas flow rate in the upper communication portion and the orifices 15 and 16 serve to adjust these flow rates.

This gas transfer must be discontinued before attainment of pressure equalization of both adsorbers. The reasons are not yet certain but it is presumable that the desorption of components adsorbed on CMS increases rapidly after pressure equalization. Valves 11 and 12 are closed and the gas transfer is thus discontinued when the absolute pressure ratio between the adsorber 1 (A), which is the gas supplying side, and the adsorber 2 (B), which is the gas receiving side, has arrived at a value within the range of 0.10 to 0.70, preferably 0.15 to 0.40. The diameters of orifices 15 and 16 are adjusted so that the time required for said gas transfer can be within 2 seconds.

Then, the valve 10 is opened and product nitrogen is thus allowed to flow back from product tank 3 to adsorber 2 (B). Such flow back procedure has been used in the art for the purpose of rinsing low purity nitrogen retained in the piping in the upper communication portion after pressure equalization of both adsorbers. The quantity of back flow is not so large, however, since large quantities cause pressure fluctuations in the product tank. In the art, the flow back procedure is carried out simultaneously with raw material gas mixture feeding.

In accordance with the invention, the flow back procedure is performed for the purpose of inhibiting formation of insufficiently separated nitrogen gas due to a great difference between the adsorber inside pressure and the pressure of raw material gas mixture in the initial phase of adsorption procedure rather than for the purpose of rinsing. Therefore, it is when, as a result of the back flow procedure, the gage pressure within adsorber 2 (B) has arrived at a level of about 50% or more, preferably 70% or more, of the maximum attainable gage pressure in the adsorption step that the adsorption procedure is started by opening the valve 7 and feeding the raw material gas mixture to adsorber 2 (B).

The capacity of product tank 3 should preferably be selected such that the gage pressure in product tank 3 can be maintained at a level not lower than about 70%, more preferably not lower than 80%, of the maximum gage pressure attainable in the adsorber in the adsorption step even during the period of outflow of product nitrogen gas for consumption at a constant rate and simultaneous back flow to adsorber 2 (B).

On the other hand, the regeneration of adsorber 1 (A) is carried out until the adsorption step in adsorber (B) is completed, by opening the valves 6 and 13 following discontinuation of the adsorber-to-adsorber gas transfer, thus releasing the gas adsorbed and the gas remaining in said adsorber into the atmosphere until a pressure close to atmospheric pressure, then closing the valve 13, opening the valve 14 and evacuating said adsorber to a level within the range of about 150 torr and below, preferably 50-100 torr, by means of vacuum pump 4. Thereafter, the adsorption and regeneration steps are repeated alternately in adsorber 1 (A) and adsorber 2 (B) in 180° phase shifts. The optimum period for said regeneration procedure or for the adsorption procedure inclusive of the product nitrogen gas flow back process, namely the optimum half-cycle period, is within the range of about 90 to about 180 seconds as compared with 60-90 seconds in the case of prior art processes for producing 99.0-99.9% pure nitrogen using the same CMS.

The space velocity is an important dynamic index indicative of the efficiency of a nitrogen gas separation system based on PSA.

The space velocity is defined as the flow rate of product nitrogen (measured at standard conditions) per minute per unit volume of CMS under constant adsorption procedure, namely of CMS packed in one adsorber in the case of the present invention. The performance characteristics of CMS itself has an influence on this characteristic.

When the space velocity has a small value, the capacity required of the adsorber is great and, accordingly, the quantity of raw material gas mixture per unit quantity of product nitrogen increases because of an increase in quantity of gas released into the atmosphere, among others. The effect is not confined to the adsorber but extends to the compressor for raw material gas mixture, the vacuum pump and so forth, making the whole equipment large-scaled and causing the cost of operation, in particular the electric fee, to increase. Thus the above situation becomes a fatal inhibitory factor to practical use of the process.

In the process according to the invention, it is premised that the space velocity should be not less than about 0.6 min$^{-1}$, preferably not less than 1.2 min$^{-1}$. Thus it is possible to install an equipment having a capacity of 1 to 1,000 Nm$^3$/hr on any site demanding nitrogen and to supply high purity (at least 99.99% pure) nitrogen at low cost.

In a fourth aspect, the invention provides a process for separating nitrogen gas in the same PSA-based nitrogen gas separation apparatus as mentioned above referring to the first aspect of the invention except for the absence of the vacuum pump, which process comprises the steps of:

(a) supplying product nitrogen at a low flow rate to the adsorbent bed in adsorber A over the whole period of regeneration thereof under atmospheric pressure via the product outlet of adsorber A, (b) communicating the adsorber A in which the atmospheric pressure regeneration step (a) mentioned above is complete with the adsorber B in which the adsorption step is complete by means of a piping to thereby cause gas transfer from adsorber B under elevated pressure to adsorber A on the basis of a pressure difference, and (c) then, just before starting the next adsorption step in adsorber A, causing back flow of product nitrogen from the product tank into adsorber A at a rate such that the sum total of the quantity of the gas transferred in step (b) mentioned above and the quantity of flow back product nitrogen constitutes a pressure corresponding to about 60% or more of the maximum gage pressure in said adsorber as found during the adsorption procedure.

The present inventors made investigations in an attempt to increase the purity of nitrogen gas by applying, to the atmospheric pressure regeneration system, the step of discontinuing the pressure equalization procedure mentioned above referring to the first to third aspects of the invention earlier than the establishment of pressure equalization of both adsorbers as well as the rinsing and other techniques and as a result, have established a process for separating 99.9% pure nitrogen gas at low cost in which the regeneration step is carried out at atmospheric pressure but not under reduced pressure.

Figure 2:
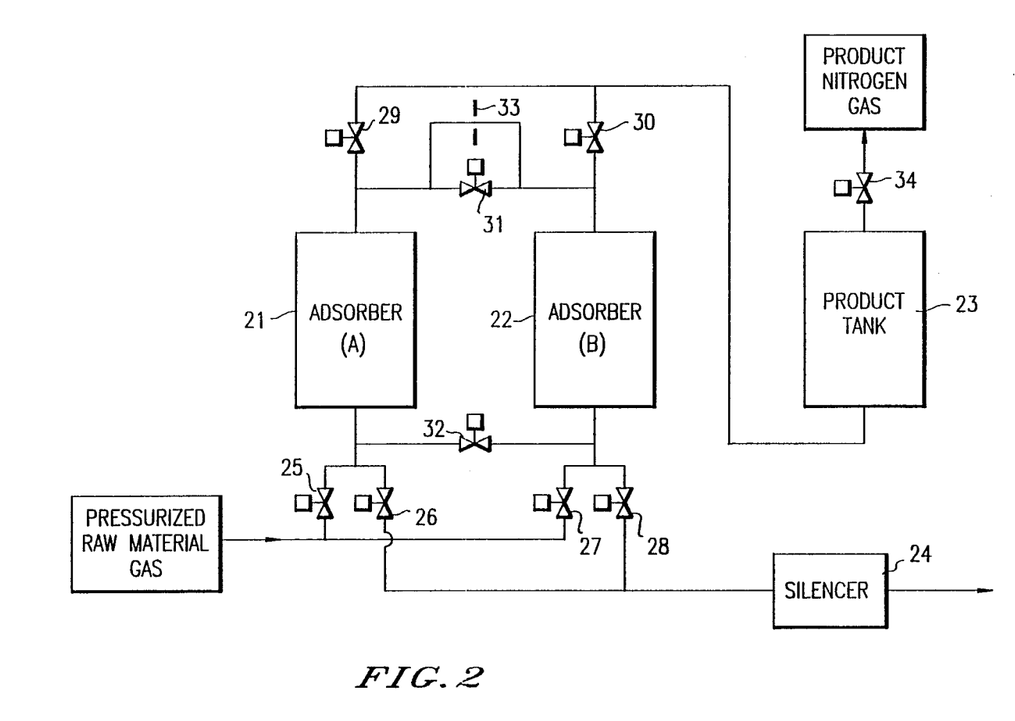
FIG. 2 is a schematic representation of an apparatus for adsorber regeneration under atmospheric pressure.

Referring to FIG. 2, the invention in its fourth aspect is now explained in further detail.

A pressurized raw material gas mixture predominantly composed of nitrogen and oxygen, such as air, enters an adsorber 21 via a valve 25 and is separated into a fraction composed of components adsorbed on CMS packed in the adsorber and a fraction composed of nitrogen and other unadsorbable components. The product nitrogen goes through a valve 29 to a product tank 23, where it is stored temporarily and then supplied to sites of consumption for certain purposes.

During the above step, another adsorber 22 is regenerated at atmospheric pressure by opening a valve 28 and thus allowing the pressure to lower to the neighborhood of atmospheric pressure, whereby the gases adsorbed are desorbed. Throughout the regeneration period, product nitrogen is fed to adsorber 22 at a low flow rate controlled by an orifice 33 disposed in the course of a piping for rinsing, whereby CMS packed in said adsorber is rinsed. The residual gas, adsorbed components and nitrogen after rinsing are all released into the atmosphere via a valve 28 and a muffler 24. When the rinsing nitrogen flow rate is either excessively high or excessively low, the purity of product nitrogen is decreased. Therefore, said flow rate should be selected optimally within the range of 5-40% of the flow rate of nitrogen separated in the adsorption step.

After the lapse of a time period predetermined such that said period ends just before the separation capacity of CMS in adsorber 21 arrives at an acceptable limit, the valves 25, 29 and 28 are closed and a valve 31 or valves 31 and 32 are opened, whereby both adsorbers are communicated with each other. The gas remaining in adsorber 21 under the elevated pressure in the adsorption step and having a high nitrogen percentage migrates, via the communicating piping, into adsorber 22 which is now under a pressure in the vicinity of atmospheric pressure, owing to the pressure difference between the adsorbers. It is particularly desirable that the valves 31 and 32 are opened simultaneously and that adjustment is made so that the gas flow rate through valve 31 can exceed the gas flow rate through valve 32.

The adsorber-to-adsorber gas transfer may be discontinued at a stage at which both adsorbers have been nearly equalized in pressure. From the product nitrogen purity viewpoint, however, said transfer should preferably and optimally be discontinued when the ratio of the gage pressure in the receiving side adsorber 22 to the gage pressure in the supplying side adsorber 21 has arrived at the range of about 0.10 to about 0.70.

Just prior to starting the next adsorption step in adsorber 22, a valve 30 is opened and thus nitrogen is caused to flow back from the product tank into adsorber 22.

In the prior art processes, the back flow technique is sometimes employed for transferring the relatively low purity nitrogen retained in the space of the product outlet portion of adsorber after adsorber-adsorber pressure equalization to the adsorption bed so that said retained nitrogen can be prevented from directly entering a product tank in the next adsorption step. In this case, in view of pressure fluctuations in the product tank, the quantity of back flow nitrogen is suppressed to a minimum which is sufficient for achieving the purpose.

When an ordinary product nitrogen purity of 99% is obtained in a PSA-based nitrogen gas separation apparatus of the atmospheric pressure regeneration type using CMS, the flow back procedure following the pressure equalization procedure has little effect on the product purity since rinsing is performed throughout the regeneration period. The flow back procedure rather produces negative effects, such as pressure fluctuations in product tank. Hence, generally, such procedure is not employed.

On the other hand, it has been shown that when 99.9% pure product nitrogen is prepared in the reduced pressure regeneration mode in which rinsing cannot be used, the flow back procedure following pressure equalization is effective in improving the product purity.

When the adsorber inside pressure is low in the beginning of the adsorption step, the raw material gas passes through the adsorbent in a very short period of time, and nitrogen at an insufficient separation state enters the product tank. Therefore, methods have been proposed, for example a method comprising discarding low purity nitrogen obtained in the early phase of adsorption step into the atmosphere.

As far as the flow back procedure according to the invention is concerned, the effect of preliminary pressurization of the relevant adsorber with high purity nitrogen before starting the adsorption step should be more emphasized than the effect in the retained gas removal mentioned above. The quantity of back flow from product tank 23 to adsorber 22 must be selected such that the sum total of the gas quantity resulting from adsorber-to-adsorber transfer and the quantity of flow back product nitrogen can correspond to about 60% or more, preferably 70% or more, of the maximum gage pressure in adsorber as found during the adsorption step.

When the flow back procedure is completed before starting raw material gas supply to adsorber 22, the time for closing valve 30 to stop back flow can be determined readily by means of a pressure gage connected to said adsorber. On the other hand, the time for starting back flow is not limited to a time before starting raw material gas supply, such as in the case mentioned above.

Thus, it is also possible to carry out back flow simultaneously with raw material gas supply by opening the valves 27 and 30. When this method is employed, the necessary back flow quantity is determined based on the pressure in adsorber 22 immediately after the adsorber-to-adsorber gas transfer, the corresponding pressure drop in product tank 23 is then calculated, and the back flow rate is adjusted accordingly by inserting an orifice or the like in the piping between valve 30 and product tank 23 or in the raw material gas supply piping.

The primary object of disposing the product tank is to level the product nitrogen purity by admixture and dilution of relatively low purity nitrogen produced just after starting the adsorption step. However, in the system according to the invention, in which product nitrogen is caused to flow back in large quantities from the product tank to the adsorber, the pressure in product tank may possible fluctuate widely, not only exerting an unfavorable influence on the maintenance of a consumer side pressure but also making it difficult to control the back flow rate. Therefore, the capacity of product tank 23 should desirably be selected so that the gage pressure in product tank can be maintained always, inclusive of the period of back flow of product nitrogen into adsorber, at a level not lower than 70% of the maximum gage pressure in adsorber as observed during the adsorption step.

The adsorber 22 starts the adsorption step upon receiving the raw material gas via valve 27. For maintaining the space velocity at a level not lower than about 1.0 $min^{-1}$, preferably not lower than 1.2 $min^{-1}$, which is a minimum requirement from the equipment cost, power cost and other respects for assuring the product nitrogen purity of 99.9% in the atmospheric pressure regeneration mode, the maximum adsorber inside pressure in the adsorption step must be not less than about 6 $kg/cm^2$ (G) in the process according to the invention as well.

On the other hand, as for adsorber 21, the valve 26 is opened following discontinuation of the adsorber-to-adsorber gas transfer, whereby the pressure drops as a result of release of the gas remaining in the adsorber out of the system and desorption and regeneration is effected in the same manner as in the case of regeneration at atmospheric pressure mentioned above. Throughout this period, rinsing is performed.

Thereafter, the adsorption and regeneration procedures are repeated in adsorbers 21 and 22 alternately in 180° phase shifts, whereby 99.9% pure nitrogen can be separated continuously from the raw material gas.

Although the apparatus referred to in the above illustration of the invention in its first to fourth aspects comprises two adsorbers which are operated in an alternate fashion, it is also possible to use three or more adsorbers in a merry-go-round fashion.

The following examples merely illustrate the present invention. They are not intended to limit the scope of the invention in any manner.

EXAMPLES 1-4 & COMPARATIVE EXAMPLES 1-5

A PSA-based nitrogen gas separation apparatus comprising two adsorbers packed with CMS as shown in FIG. 1 was used. Air pressurized to 7 $kg/cm^2$ (G) was used as the raw material and the adsorption and regeneration steps were conducted alternately with a halfcycle period of 120 seconds, and nitrogen was separated as product.

The regeneration procedure was conducted in two ways; namely atmospheric pressure regeneration was carried out operating the valve 13 alone without using the valve 14 and the succeeding devices, and reduced pressure regeneration was carried out by opening the valve 13 for depressurization, then closing said valve and opening the valve 14 for evacuation to 100 torr by means of vacuum pump 4. Only in the case of regeneration at atmospheric pressure, rinsing was performed during the regeneration period.

At the time of switching over from adsorption to regeneration, the valves 11 and 12 were opened for 2 seconds for gas transfer via the upper and lower communication portions by making use of pressure differences between the adsorbers.

The gas transfer flow rate was adjusted by varying the opening area ratio between orifices 15 and 16, while the total opening area of orifices 15 and 16 was maintained constant.

While other basic conditions were maintained constant, nitrogen separation runs were made varying the adsorber-to-adsorber gas transfer flow rate ratio. The product nitrogen qualities (in terms of residual oxygen percentage by volume) thus obtained are summarized below in Table 1.

TABLE 1

|   | Regeneration under | Gas transfer flow rate ratio (%) | Residual oxygen concentration (%) |
|---|---|---|---|
| Example 1 | Atmospheric pressure | 25 | 0.64 |
| Example 2 | Atmospheric pressure | 50 | 0.67 |
| Comparative Example 1 | Atmospheric pressure | 0 | 0.75 |
| Comparative Example 2 | Atmospheric pressure | 100 | 0.72 |
| Example 3 | Reduced pressure | 6 | 0.064 |
| Example 4 | Reduced pressure | 25 | 0.069 |
| Comparative Example 3 | Reduced pressure | 0 | 0.086 |
| Comparative Example 4 | Reduced pressure | 80 | 0.080 |
| Comparative Example 5 | Reduced pressure | 100 | 0.082 |

EXAMPLE 5-6 & COMPARATIVE EXAMPLE 6-8

A PSA-based nitrogen gas separation apparatus comprising two adsorbers packed with CMS as shown in FIG. 1 was used and nitrogen was separated from air pressurized to 7 $kg/cm^2$ (G) by performing alternately the adsorption procedure and the regeneration procedure under a reduced pressure of 80 torr (minimum achievable value). The half-cycle period was 100 seconds.

The flow rate ratio in the gas transfer between the adsorber in which the adsorption step was complete and the adsorber in which the regeneration step was complete was adjusted to 0.11. The adsorber-to-adsorber gas transfer was discontinued when the absolute pressure ratio between the receiving side adsorber and the gas supplying side adsorber showed a value specified below in Table 2. The product nitrogen qualities (in terms of residual oxygen concentration in percent by volume) obtained for the respective absolute pressure ratios are summaried in Table 2.

The raw material air was fed at a rate such that the sum total of the quantity of gas transferred in the above manner and the quantity of product nitrogen caused to flow back from the product tank into the gas-receiving side adsorber corresponded to 80% of the whole gas quantity in said adsorber corresponding to the maximum pressure in the adsorber. The product tank capacity was such that the gage pressure in the tank could be always maintained at levels not lower than 85% of the maximum pressure in each adsorber. Other basic conditions were the same for the five runs performed.

TABLE 2

|  | Gas tramsfer flow rate ratio (%) | Pressure ratio upon completion of gas transfer | Residual oxygen concentration in product nitrogen (%) |
|---|---|---|---|
| Example 5 | 0.11 | 0.25 | 0.045 |
| Example 6 | 0.11 | 0.42 | 0.038 |
| Comparative Example 6 | 0.11 | 0.05 | 0.076 |
| Comparative Example 7 | 0.11 | 0.80 | 0.099 |
| Comparative Example 8 | 1.0 | 0.42 | 0.087 |

EXAMPLE 7

A PSA-based nitrogen gas separation apparatus as shown was used. Each adsorber was packed with a CMS showing an oxygen adsorption of 7.7 cc/g in equilibrium at 25° C. and one atmosphere and an oxygen/nitrogen adsorption ratio of 8.44 as measured after 60 seconds of adsorption.

Air pressurized to 8.5 kg/cm$^2$(G) was used as the raw material and the half-cycle period for adsorption or regeneration was 120 seconds. The minimum pressure attained in the regeneration step was 80 torr. The gas transfer from the adsorber in which the adsorption step was complete to the adsorber in which the reduced pressure regeneration step was complete was carried out while the flow rate through the lower communication was adjusted to 6% of the flow rate through the upper communication. The gas transfer was discontinued when the ratio of the absolute pressure in the gas receiving side adsorber to that in the gas supplying side adsorber became 0.25. The time required for this gas transfer was 1.2 seconds.

Then, product nitrogen was caused to flow back from the product tank to said receiving side adsorber for 0.2 second and, when the pressure in said adsorber arrived at 85% of the maximum gage pressure attained in the adsorption step, the feeding of raw material pressurized air was started.

Even in the flow back step during which product nitrogen was supplied to an external equipment continued at a rate of 10 Nm$^3$/hr, the pressure in the product tank could be maintained at levels not lower than 85% of the maximum gage pressure attained in the adsorber under adsorption procedure. The capacity of the product tank used was 4 times that of the adsorbers.

As for the quality of the product nitrogen obtained in this example, a residual oxygen concentration of 73 ppm and a dew point at atmospheric pressure of −70° C. or below were obtained constantly at a space velocity of 1.5 min$^{-1}$.

When the rate of supply from product tank to external equipment was reduced to 5 Nm$^3$/hr, the residual oxygen concentration in product nitrogen decreased to 5.7 ppm.

EXAMPLE 8

A PSA-based nitrogen gas separation apparatus comprising two CMS-packed adsorbers as shown in FIG. 2 was used. Air pressurized such that the maximum attainable pressure in the adsorber in the adsorption step amounted to 7 kg/cm$^2$(G) was used as the raw material.

The time for each adsorption step inclusive of back flow, namely the half-cycle period, was 100 seconds. Gas transfer was effected from the adsorber in which the adsorption step was complete to the adsorber in which the atmospheric pressure regeneration step inclusive of rinsing was complete, by opening the valves 31 and 32 and, when the ratio of the gage pressure in the receiving side adsorber to that in the supplying adsorber had reached 0.50, the gas transfer was discontinued.

Then, nitrogen was caused to flow back from the product tank to the adsorber in which the adsorption step was to be started until the pressure in said adsorber reached 5.5 kg/cm$^2$ (G) and, thereafter, the supply of raw material air was started.

The product nitrogen output was selected such that, under the above conditions, the space velocity could amount to 1.4 min$^{-1}$. As a result, the quality of product nitrogen attained in this example was such that a residual oxygen concentration of 730 ppm and a dew point at atmospheric pressure of about −70° C. could be obtained constantly.

COMPARATIVE EXAMPLE 9

The same apparatus as used in Example 8 was used and nitrogen was separated from air under the same conditions as in Example 8 except that the step of causing nitrogen to flow back from the product tank into the adsorber ready for starting the adsorption step was omitted.

The residual oxygen concentration in product nitrogen as observed at a space velocity of 1.4 min was 2,860 ppm.

COMPARATIVE EXAMPLE 10

The same apparatus as used in Example 8 was used and nitrogen was separated from air under the same conditions as used in Example 8 except that rinsing was not performed in the atmospheric pressure regeneration step.

The residual oxygen concentration in product nitrogen as observed at a space velocity of 1.4 min$^{-1}$ was 2,390 ppm.

What is claimed is:

1. A process for separating nitrogen gas from a pressurized gas mixture predominantly composed of nitrogen gas and oxygen gas in a nitrogen gas separation apparatus comprising a plurality of adsorbers packed with a carbon molecular sieve and operable under the pressure swing adsorption system, which comprises the steps of:
   (a) carrying out the transfer of the gas under pressure remaining in an adsorber A in which the adsorption step is complete to an adsorber B in which the regeneration step is complete simultaneously through a piping connecting the raw material gas inlet of adsorber A to that of adsorber B and through a piping connecting the product nitrogen outlet of adsorber A to that of adsorber B while adjusting the ratio of the gas transfer flow rate on the raw material gas inlet communication side to the gas transfer flow rate on the product nitrogen outlet communication side to about 3 to about 40%, (b) discontinuing the gas transfer mentioned above under (a) when the absolute pressure ratio between the pressure inside the adsorber B, which is the gas receiving side, to the pressure inside the adsorber A, which is the gas supplying side, has arrived at a value within the range of about 0.10 to about 0.70, and (c) then, just prior to starting the next adsorption step, causing back flow of product nitrogen from a product tank into adsorber B to an extent such that the sum total of the quantity of the gas transferred in the above step (b) and the quantity of back flow product nitrogen amounts to about ½ or more of the total gas quantity in adsorber B at the time when a maximum pressure is found during the adsorption step.

2. A process for separating nitrogen gas as claimed in claim 1, wherein the period for the gas transfer from adsorber A to adsorber B is not longer than about 3 seconds.

3. A process for separating nitrogen gas as claimed in claim 1 or 2, wherein the gage pressure in the product tank is always maintained at about 70% or more of the maximum gas pressure in adsorber during the adsorption step, inclusive of the period of back flow of product nitrogen into adsorber B.

4. A process for separating nitrogen gas as claimed in claim 3, wherein the maximum pressure attained in the adsorber during the adsorption step is not lower than about 5 kg/cm$^2$ (G).

5. A process for separating nitrogen gas as claimed in claim 1 or 2, wherein the maximum pressure attained in the adsorber during the adsorption step is not lower than about 5 kg/cm$^2$ (G).

6. A process for separating at least 99.99% pure nitrogen gas from a pressurized gas mixture containing more than 78% of nitrogen gas by volume, oxygen and small amounts of other gases in a nitrogen gas separation apparatus comprising two adsorbers packed with a carbon molecular sieve and operable under the pressure swing adsorption system, which comprises the steps of:

(a) carrying out the transfer of the gas under pressure remaining in an adsorber A in which the adsorption step is complete to an adsorber B in which the regeneration step under reduced pressure is complete through a piping connecting the raw material gas inlet of adsorber A to that of adsorber B and simultaneously through a piping connecting the product nitrogen outlet of adsorber A to that of adsorber B under reduced pressure while adjusting the ratio of the gas transfer flow rate on the product nitrogen outlet communication side to about 3 to about 40% and discontinuing the gas transfer before both adsorbers are equalized in pressure, (b) then bringing the product nitrogen outlet of adsorber B into communication with the inlet of a product tank to thereby cause back flow of product nitrogen into adsorber B and, when the gage pressure in adsorber B has arrived at about 50% or more of the maximum gage pressure during the adsorption step, starting the adsorption step by introducing the raw material gas mixture into adsorber B, and (c) carrying out the regeneration step in adsorber A, following the discontinuation of adsorber-to-adsorber gas transfer in step (a), by releasing the gas remaining in said adsorber into the atmosphere to the neighborhood of atmospheric pressure followed by evacuation to about 150 torr or below by means of a vacuum pump, the adsorption and regeneration steps being alternately repeated in adsorbers A and B, the time required for said regeneration step and for said adsorption step inclusive of the product nitrogen back flow process being within the range of about 90 seconds to about 180 seconds.

7. A process for separating nitrogen gas as claimed in claim 6, wherein the maximum pressure attained in the step of adsorption and separation of the raw material gas mixture is not lower than about 5 kg/cm$^2$ (G).

8. A process for separating nitrogen gas as claimed in claim 6 or 7, wherein the space velocity is at least 0.6 min$^{-1}$.

* * * * *